United States Patent [19]
Janke

[11] 4,181,036
[45] Jan. 1, 1980

[54] STEPPED-RATIO GEARING FOR MOTOR VEHICLES

[75] Inventor: Fritz Janke, Nauheim, Fed. Rep. of Germany

[73] Assignee: General Motors Corporation, Detroit, Mich.

[21] Appl. No.: 908,963

[22] Filed: May 24, 1978

[30] Foreign Application Priority Data

May 26, 1977 [DE] Fed. Rep. of Germany ....... 2723761

[51] Int. Cl.² ............................................. G05G 5/10
[52] U.S. Cl. ................................... 74/477; 74/473 R
[58] Field of Search ............... 74/473 R, 473 P, 475, 74/477

[56] References Cited

U.S. PATENT DOCUMENTS

| | | | |
|---|---|---|---|
| 2,309,837 | 2/1943 | Fishburn | 74/475 |
| 3,292,451 | 12/1966 | Jacklin et al. | 74/477 |
| 3,382,732 | 5/1968 | Oram et al. | 74/473 |
| 3,545,295 | 12/1970 | Ravello | 74/477 X |
| 4,022,079 | 5/1977 | Hidaka | 74/477 X |
| 4,048,870 | 9/1977 | Hulsebusch | 74/473 R |

FOREIGN PATENT DOCUMENTS

1273960 5/1972 United Kingdom .
1461328 1/1977 United Kingdom .
1493035 11/1977 United Kingdom .

*Primary Examiner*—Lance Chandler
*Attorney, Agent, or Firm*—A. M. Heiter

[57] ABSTRACT

Stepped-ratio gearing for motor vehicles incorporates a simplified arrangement for the noiseless engagement of reverse ratio, by the use of a synchronizing arrangement for one of the forward ratios.

For this purpose a motion-transmitting member is connected to a shift member (for example a shift fork) and/or to a selector shaft and is effective during movement of this shift member and/or selector shaft to act upon a shift fork for a synchronized forward ratio to effect a movement of the shift fork to provide pre-synchronization, with braking of rotating elements of the stepped-ratio gearing for engagement of the reverse ratio, and thereby noiseless engagement of the reverse ratio.

9 Claims, 6 Drawing Figures

STEPPED-RATIO GEARING FOR MOTOR VEHICLES

This invention relates to stepped-ratio gearing for motor vehicles.

A well-known construction of a motor vehicle gearbox utilising stepped-ratio gearing makes use of constant-mesh countershaft gearing to provide differing relative speeds of rotation of gear wheels that are individually rotatably mounted on a gearbox mainshaft, with the individual forward ratios being engaged by selective coupling of the appropriate gear wheel to the mainshaft by the action of coupling members provided with synchronizing arrangements (possibly associated with blocking members), and a reverse ratio being engaged by movement of a selector shaft to cause a shift member to bring a sliding-mesh reverse-ratio gear pinion into meshing engagement with both a countershaft gear and one of the gear wheels on the mainshaft. With this construction a synchronizing arrangement is usually not provided for the reverse ratio, on the basis that the reverse ratio is normally selected when the vehicle is stationary. Inasmuch as provision of the reverse-ratio gear train with its own synchronizing arrangement could be expensive and space-consuming, there are clear advantages in simplifying the construction by dispensing with a separate reverse-ratio synchronizer. On the other hand, noiseless engagement of the reverse ratio involves the gears of the reverse-ratio train being stationary in the declutched condition, and although this may well be the case when the reverse ratio is being engaged with the vehicle stationary, or when following forward movement of the vehicle the shift into the reverse ratio is delayed for a sufficiently long time to allow the rotating parts to come to rest, with such a simplified construction noiseless engagement of the reverse ratio is not possible during a rapid shift into reverse after declutching following forward movement of the vehicle.

The present invention is concerned with a form of construction permitting noiseless engagement of the reverse ratio without the need for a reverse-ratio synchronizer on the gearbox mainshaft.

In stepped-ratio gearing for motor vehicles in accordance with the present invention, for engagement of reverse ratio a reverse-ratio gear pinion is slidable by a shift member into meshing engagement with a mainshaft gear and a countershaft gear, the shift member is selectable by a selector shaft, and a motion-transmitting member connected to the shift member and/or to the selector shaft is effective, during movement of this shift member and/or selector shaft, to act upon a shift fork for a synchronized forward ratio to effect movement of the shift fork to provide pre-synchronization, with braking of rotating elements of the stepped-ratio gearing for engagement of the reverse ratio.

Such a form of construction can provide the required reverse-ratio synchronization with the use of only a few additional parts, and indeed can if required be fitted into a gearbox not provided with reverse-ratio synchronization, without the gearbox dimensions having to be increased. Basically, it is sufficient to replace a few components by others which are provided with extra parts and to a certain extent have a modified shape, so that the required silent gear-change into the reverse ratio may be achieved by making use of the synchronizing means for one of the forward ratios for braking the rotating elements including the clutch drive plate, the drive shaft connected thereto, the gearbox countershaft and the rotating mainshaft gears.

As a practical matter, after the braking of the rotating elements the axial movement of the shift fork utilised for the pre-synchronization must cease before the forward-ratio engagement position is reached, and then the shift fork and its control shaft must be caused to move back into the initial position. To meet the first of these requirements the motion-transmitting member may be pivotally mounted and exert its action on a cam surface of such a length as to correspond to the required amount of movement, with the motion-transmitting member on its return movement pivoting to slide idly over the cam surface. To meet the second requirement the control shaft may be provided, in a manner known per se, with trough-shaped depressions for engagement by a spring-urged ball detent which thereby resiliently tend to maintain both the control shaft and the shift fork in an initial position, or in one of two forward-ratio positions, by a latching action, and by its resilient action provides the required return movement of the control shaft and shift fork to the initial position subsequent to pre-synchronization.

In the case of a gearbox having blocking synchronization, appropriately a recess in an axially displaceable control shaft has such a length relative to a shoulder of an intermediate shift lever engaging in the recess that a pre-synchronization for engagement of the reverse ratio is possible, but the blocking action is maintained.

In principle, the synchronizer for any forward ratio could be utilised for the pre-synchronization, so allowing choice of that particular shift fork or control shaft which requires the least constructional outlay for its movement to effect the pre-synchronization. Such choice will depend upon the type of gearbox, but it will be appropriate in many cases to utilise the shift fork for the third and fourth forward ratios for the pre-synchronization, and to move this shift fork in the direction of the fourth-ratio position.

The pre-synchronization or its initiation should of course take place as early as possible before meshing of the sliding gear, to allow sufficient time for braking of the rotating elements. It will be advantageous, therefore, for the movement of the shift fork to be derived from the movement of a part for selecting the reverse ratio. However, it may alternatively be found appropriate for the movement of the shift fork to be derived from the movement of a part for the engagement of the reverse ratio.

The appended claims define the scope of the invention claimed. The invention and how it can be performed are hereinafter particularly described with reference to the accompanying drawings, in which:

Figure 1:
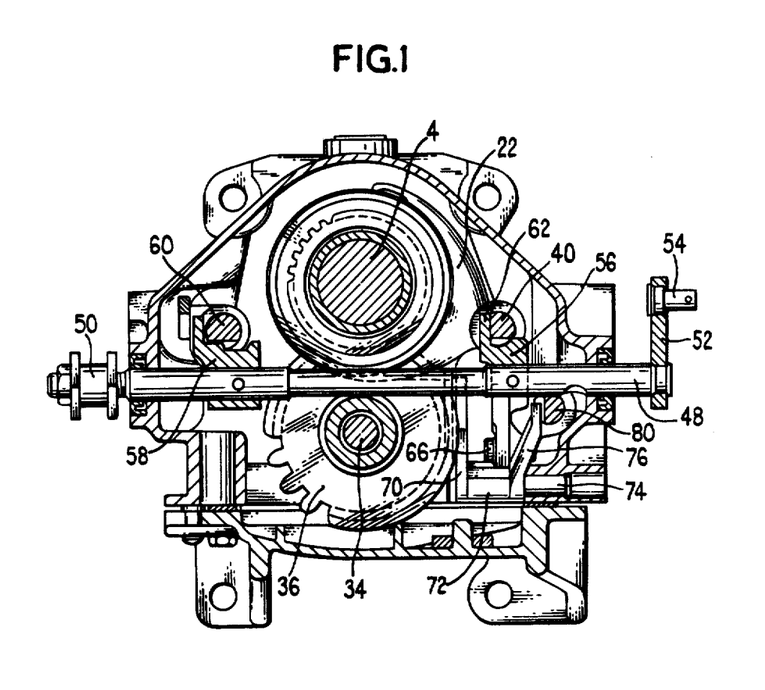
FIG. 1 is a cross-section through a four-speed gearbox.
Figure 2:
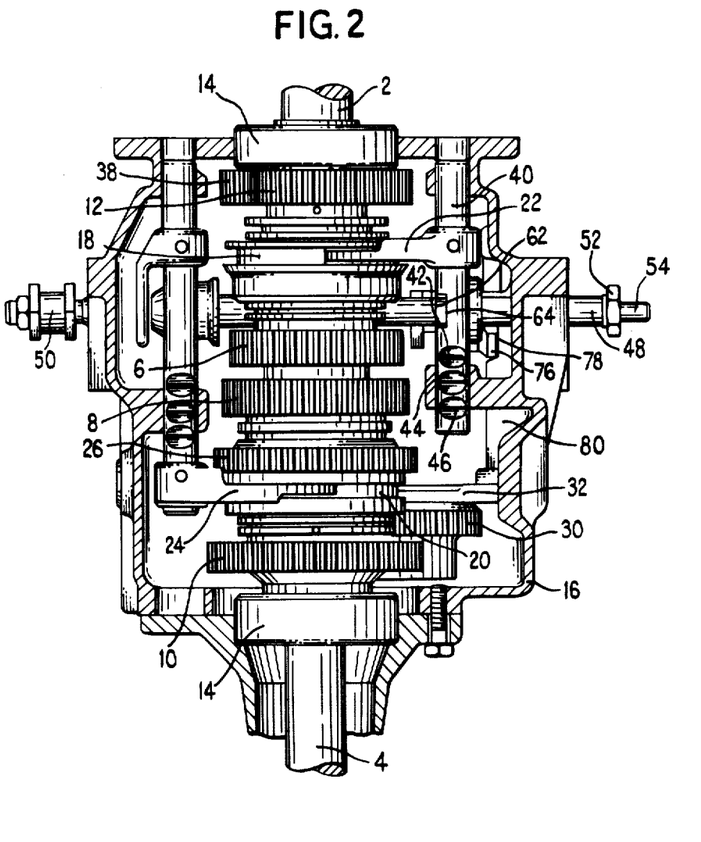
FIG. 2 is a longitudinal section through the same gearbox in a horizontal plane, with some parts shown in elevation.

In the drawings, FIG. 2 shows a drive shaft 2 constituted by a clutch output shaft having a recessed end accommodating the front end of a gearbox mainshaft 4. Toothed gears 6, 8 and 10 are individually rotatably mounted on the mainshaft, 6 being the mainshaft gear for third ratio, 8 the mainshaft gear for second ratio, and 10 the mainshaft gear for first ratio. A toothed gear 12 fixed to the drive shaft 2 constitutes a gear for fourth ratio. The drive shaft 2 and the mainshaft 4 are mounted in ball-bearings 14 which are accommodated in end walls of a gearbox housing 16. Also visible on the mainshaft 4 are shift sleeves 18 and 20 having circumferential grooves for shift forks 22 and 24 respectively. The shift sleeve 20 is formed in part as a toothed gear 26 which is engageable by an axially displaceable (sliding-mesh) reverse-ratio gear pinion 30. Displacement of this reverse-ratio gear pinion 30 is effected by a shift fork 32.

A countershaft gear cluster 36 is rotatably mounted on a countershaft 34 having a toothed drive gear 38 (FIG. 2) which is in engagement with the toothed gear 12 of the drive shaft 2, such that the gears 12 and 38 constitute head gears for driving the countershaft gears 36. The remaining toothed gears of the countershaft cluster 36 are not identified in further detail; the forward gears are in constant meshing engagement with the toothed gears 6, 8 and 10 respectively on the mainshaft 4, and the reverse ratio gear pinion 30 faces toothed gear 26. During movement into the individual ratios, the shift forks 22 or 24 axially displace the shift sleeves 18 or 20 for engagement with the mainshaft gear corresponding to the ratio selected.

A synchronizing device, for example one utilising the known type of synchro ring, ensures that the speed of the gearbox mainshaft and shift sleeve connected to rotate therewith is matched to the speed of the selected mainshaft gear 6, 8 or 10 driven by the drive shaft 2 via the head gears 12 and 38 and the countershaft gear cluster 36.

Since normally the vehicle is stationary for a shift into reverse ratio, the gearbox mainshaft is not itself rotating during the selection and engagement of the reverse ratio. However, the drive shaft 2 (which has a clutch plate, not shown, fixed thereto), the countershaft gearing 36, and the mainshaft gears 6, 8 and 10 still continue to rotate for a certain time after declutching for a shift into reverse ratio. In conformity with the present invention, provision is made for operating the synchronizing device for a forward ratio, prior to engagement of the reverse ratio, whereby the synchronizing device slows the rotating masses until they come to a standstill, for quiet engagement of the reverse ratio.

In the embodiments shown by way of example (FIGS. 1-6), the synchronizing device of the fourth forward ratio is used for synchronization for the shift into reverse ratio.

In more detail (FIGS. 3 and 5), the shift fork 22 is connected to a 3-4 control shaft 40 which is mounted in a longitudinally displaceable manner in the gearbox housing 16 and has three trough-shaped depressions 42, 44 and 46. Extending into one of these depressions there is a spring-urged detent ball (not shown) for resilient retention of the control shaft 40 in an initial position (neutral position) or in an engagement position for the third or fourth forward ratio. An intermediate shift lever 56 for the third and fourth ratios has a shoulder 47 accommodated in a recess 49 as best shown in (FIG. 5) provided in the control shaft 40, to ensure that the third and fourth forward ratios cannot be engaged simultaneously. In the axial direction, this recess 49 is longer than the shoulder 47, so permitting longitudinal displacement of the control shaft 40 by an amount providing synchronization by the action of the fourth-ratio synchronizer whilst maintaining the blocking action of the detent ball.

Below the control shaft 40 and transverse to the longitudinal axis of the gearbox, there extends a selector shaft 48 that is axially movable for ratio selection. For this purpose one end of the selector shaft 48 is provided with a sleeve 50 for the reception of an arm of a relay lever (not shown) which can be pivoted—by movement of a gearshift lever (not shown)—in a horizontal plane in such a way that the selector shaft 48 can thereby be displaced in either axial direction. The selector shaft 48 can be turned about its axis, for engagement of the selected gear ratio, by a lever arm 52 that is disposed at the other end of the shaft 48 and has a trunnion 54 engageable by a pull rod (also not shown) operated from the gearshift lever.

The intermediate shift lever 56 (FIGS. 1 and 3) for the third and fourth ratios is fixedly connected to the selector shaft 48. Correspondingly, there is an intermediate shift lever 58 for the first and second ratios which co-operates with a control shaft 60, with which the present invention is not directly concerned. By axial displacement of the selector shaft 48, a shift finger 62 of the intermediate shift lever 56 is selectively engageable with a recess 64 in the 3-4 control shaft 40, whereafter the third or fourth forward ratio can be engaged by axial displacement of the 3-4 control shaft 40.

Figure 5:
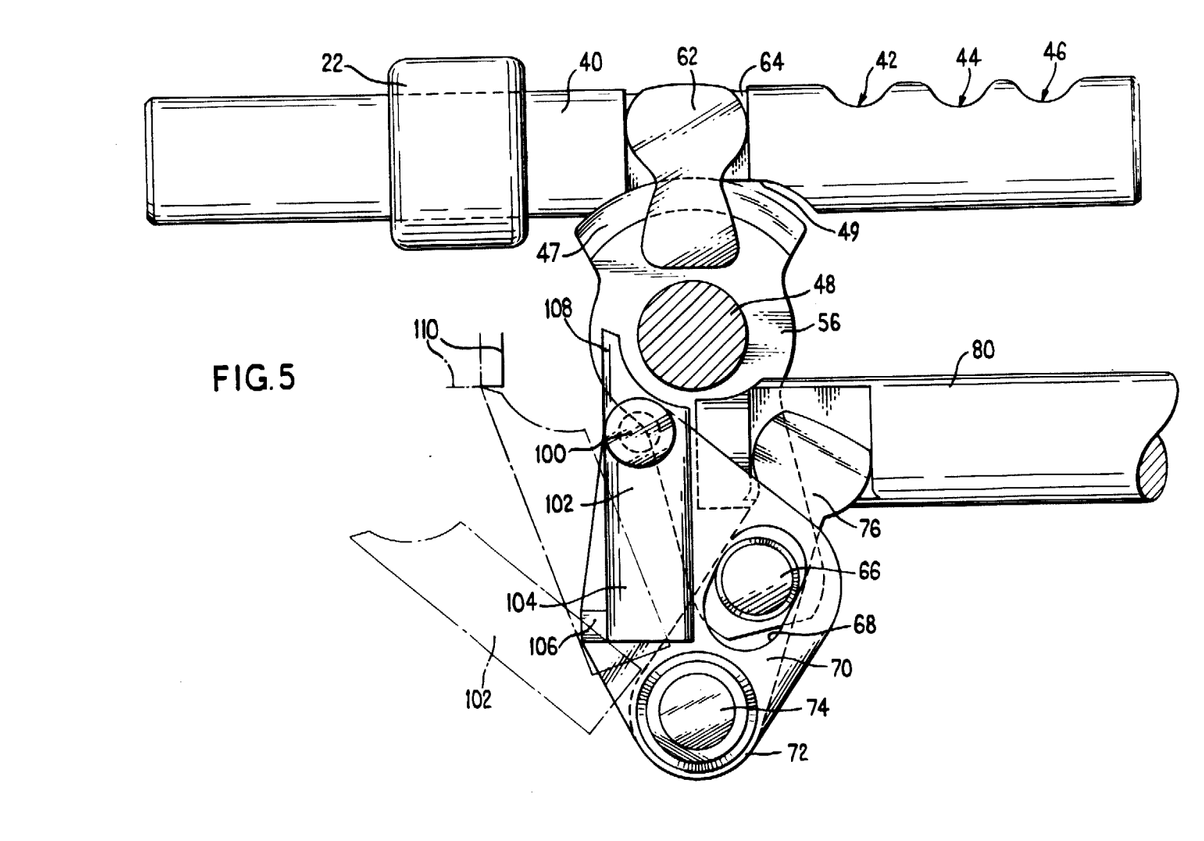
FIG. 5 shows an arrangement in accordance with the present invention for moving a forward-ratio shift fork during shift movement into the reverse ratio.
Figure 6:
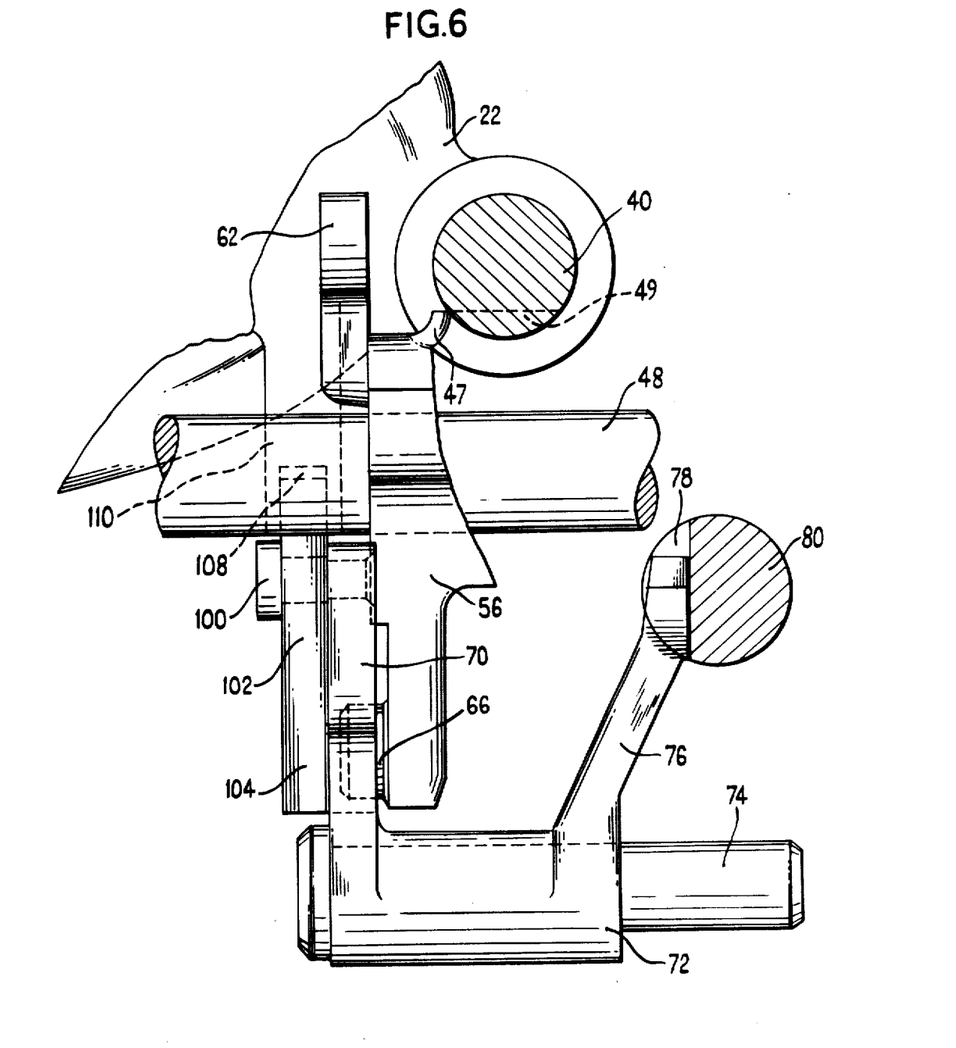
FIG. 6 shows the same arrangement in side elevation.

If the selector shaft 48 is displaced towards the left, into the position shown in FIG. 6, a pin 66 on the intermediate shift lever 56 engages in an elongated hole 68 (FIG. 5) in a lever arm 70 of an intermediate shift lever 72 for the reverse ratio. The intermediate shift lever 72 is mounted in an overhung manner in the gearbox housing 16 by means of a bolt 74, and is provided with a further lever arm 76. This further lever arm 76 has a free end engaged in a recess 78 in a control shaft 80 for the reverse ratio, this control shaft 80 having the shift fork 32 for the sliding-mesh reverse-ratio gear pinion 30 connected thereto.

Thus, for selection and engagement of the reverse ratio, the pin 66 of the intermediate shift lever 56 engages in the elongated hole 68 in the lever arm 70 of the intermediate shift lever 72 for the reverse ratio, and then by appropriate turning of the selector shaft 48 the reverse-ratio control shaft 80 is displaced axially to cause the shift fork 32 to slide the reverse-ratio gear pinion 30 into engagement with the mainshaft gear 26 and with the corresponding reverse-ratio gear of the countershaft cluster 36.

Figure 3:
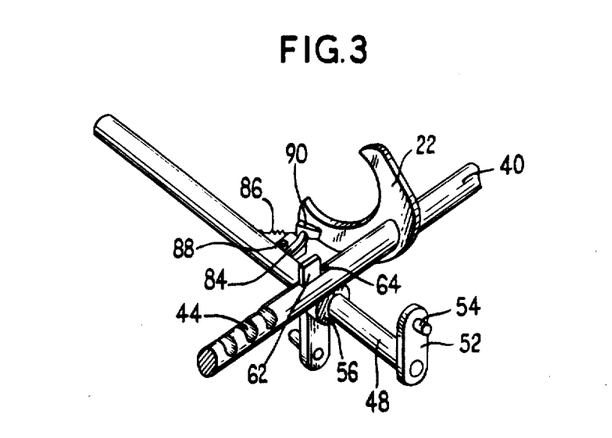
FIG. 3 shows in fragmentary perspective an arrangement in accordance with the present invention for moving a forward-ratio shift fork during selection of the reverse-ratio.
Figure 4:
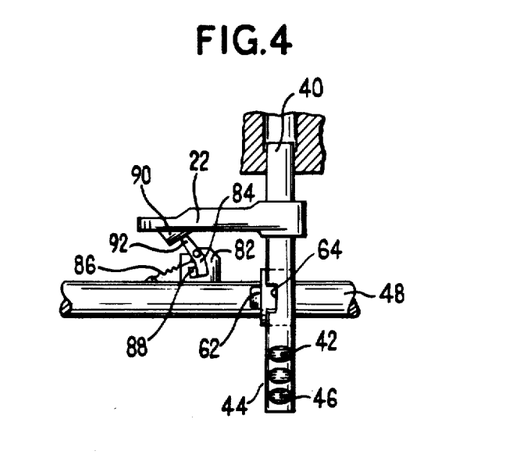
FIG. 4 shows the same arrangement as a fragmentary plan view.

FIGS. 3 and 4 illustrate an arrangement in accordance with the present invention for moving a forward-ratio shift fork (the 3-4 shift fork) into a pre-synchronization position during selection of the reverse ratio. For this purpose, fixedly connected to the selector shaft 48 there is a bearing member 82 which is directed towards the 3-4 shift fork 22, and an entrainment detent 84 is pivotally mounted on bearing member 82 and resiliently held against a stop 88 by a tension spring 86. Formed on the 3-4 shift fork 22 there is an oblique surface 90 against which the entrainment detent 84 bears by means of the free end of one lever arm 92. If the reverse ratio is selected, by displacement of the selector shaft 48 towards the left as viewed in FIG. 4, the entrainment detent 84 slides over the oblique surface 90 with a camming action, thereby displacing the oblique surface and the shift fork 22 in the direction of the fourth ratio. The oblique surface is so designed that, after pre-synchronization has taken place, there is no further movement of the shift fork 22 towards the fourth-ratio position because the lever arm 92 of the entrainment detent 84 slides off the end of the oblique surface 90.

To allow movement of the control shaft 40 with the shift fork 22 for the pre-synchronization, the recess 49 in the control shaft 40 is longer than the shoulder 47, as already stated. The spring-loaded detent ball co-operates with the depression 44 to ensure that the control shaft 40 is moved back into its initial position when the entrainment detent 84 no longer acts on the oblique surface 90 of the shift fork 22. Return movement of the control shaft 40 to the right as viewed in FIG. 5 is possible because the entrainment detent 84 is able to evade the cam formed by the oblique surface 90, by making a rotary movement away from the stop 88, in opposition to the action of the tension spring 86. After passing the oblique surface 90, the entrainment detent 84 is returned by spring action to its initial position abutting the stop 88. This arrangement utilising pre-synchronization of the fourth ratio on selection of the reverse ratio is illustrated in a schematic manner in FIGS. 3 and 4.

FIGS. 5 and 6 show, as an alternative embodiment, an arrangement in which the pre-synchronization takes place only on engagement movement into the reverse ratio. The control shaft 40 possesses, as well as the trough-shaped depressions 42, 44 and 46, the recess 64 into which the shift finger 62 of the intermediate shift lever 56 for the third and fourth ratio can be moved. In FIG. 6, the pin 66 of the intermediate shift lever 56 is shown in engagement with the elongated hole 68 in the lever arm 70 of the intermediate shift lever 72 for the reverse ratio. The further lever arm 76 of the intermediate shift lever 72 has its end engaged in a recess 78 in the control shaft 80 for the reverse ratio. An entrainment detent 102 is rotatably journalled on a pivot pin 100 on the lever arm 70. By means of the lever arm 104, which operates in pendulum fashion, the lower end of the entrainment detent abuts the stop 106. In FIG. 5, the initial position of the intermediate shift lever 72 for the reverse ratio is indicated in full lines. A tip portion 108 of the entrainment detent 102 is able to act on a stop constituted by an extension 110 of the shift fork 22. In FIG. 5, this extension 110 is for clarity indicated merely as an angled edge, with the full lines denoting the initial position (neutral position) of the extension 110.

On engagement of the reverse ratio, the intermediate shift lever 72 for the reverse ratio, and with it the entrainment detent 102, moves in the counterclockwise direction as viewed in FIG. 5. The tip portion 108 of the entrainment detent 102 meanwhile strikes the stop formed by the extension 110 and carries the extension—and with it the shift fork 22—along to the position indicated in dash-dot lines, in which the pre-synchronization is terminated. The tip portion 108 then slides off the extension 110, whereafter the entrainment detent can move into the left-hand position shown in interrupted lines in FIG. 5. It is only during this final portion of the movement that the sliding-mesh reverse-ratio gear pinion 30 (FIG. 2) comes into meshing engagement with the corresponding mainshaft and countershaft gears, which are already braked by the fourth-ratio synchronizer.

During return movement of the intermediate shift lever 72 into its initial position, the entrainment detent 102 moves underneath and past the extension 110, with pivoting of the entrainment detent 102 about the pivot pin 100. When the pre-synchronization is complete, the spring-loaded ball detent co-operating with the trough-shaped depression 44 automatically returns the 3–4 control shaft 40 into its initial position.

I claim:

1. Stepped-ratio gearing for motor vehicles, comprising individual forward-ratio gears which are rotatably mounted on a rotary mainshaft and are in constant mesh with countershaft gearing to be driven thereby at differing speeds, coupling means which are mounted for rotation with said mainshaft and are selectively movable for synchronized engagement of a plurality of forward ratios including a fourth forward ratio, a shift fork selectively movable in the direction of a fourth-ratio position for synchronized engagement of a fourth forward ratio by the action of said coupling means, a reverse-ratio pinion, a manually operable selector shaft, a shift member selectively movable by said selector shaft to slide said reverse-ratio pinion into meshing engagement with one of said forward-ratio gears and with said countershaft gear means for engagement of a reverse ratio, and motion-transmitting means constituted by a spring-loaded entrainment detent that is pivotally mounted on said selector shaft or on a part movable therewith and, on movement of said selector shaft for selection of said reverse ratio, exerts a camming action upon an oblique surface arranged on said shift fork or on a part movable therewith, to thereby displace said shift fork in the direction of its fourth-ratio position by a pre-synchronization amount effective to achieve noiseless synchronized engagement of said reverse ratio.

2. Stepped-ratio gearing for motor vehicles, comprising constant-mesh forward-ratio gears and associated slidable coupling members provided with synchronizer means for selective synchronous engagement of a plurality of forward ratios, a sliding-mesh reverse-ratio gear train selectively actuable by pivotal movement of an intermediate shift lever into a reverse-ratio engagement position, a shift fork selectively movable to actuate a coupling member as aforesaid for third and fourth forward ratios, a cam surface arranged on said shift fork or on a part movable therewith, and an entrainment detent rotatably mounted on said intermediate shift lever, said entrainment detent comprising a tip portion which forms one lever arm thereof and also comprising another lever arm which is selectively movable into abutment with stop means on said intermediate shift lever, and on movement of said intermediate shift lever for engagement of reverse ratio said tip portion exerts a camming action upon said cam surface to thereby displace said shift fork towards a fourth-ratio position thereof only by a pre-synchronization amount effective to achieve noiseless synchronized engagement of said reverse ratio, and on return movement of said intermediate shift lever said entrainment detent executing a pendulum movement to pass idly by said cam surface, with subsequent return of said other lever arm into abutment with said stop means.

3. Stepped-ratio gearing for motor vehicles, comprising a plurality of constant-mesh forward-ratio gears, a sliding-mesh reverse-ratio gear train, a slidable coupling member selectively movable by a shift fork into a fourth-ratio engagement position, synchronizer and blocking means operatively associated with said coupling member for noiseless synchronous engagement of said fourth forward ratio, an axially displaceable control shaft operatively connected to said shift fork for effecting ratio-engagement movement thereof, spring-loaded detent means for resiliently maintaining said control shaft in each of a plurality of axial positions, a manually operable selector shaft having an intermediate shift member operatively connected thereto, a selectively operable connection between said intermediate shift member and an intermediate shift lever that is pivotally movable into a reverse-ratio engagement position, an operative connection between said intermediate shift member and said control shaft for effecting movement of said control shaft and shift fork into said fourth-ratio engagement position, said operative connection including a shoulder on said intermediate shift member accommodated in a recess in said control shaft, a cam surface arranged on said shift fork or on said control shaft, and an entrainment detent rotatably mounted on said intermediate shift lever, said entrainment detent comprising a tip portion which forms one lever arm thereof and also comprising another lever arm which is selectively movable into abutment with stop means on said intermediate shift lever, and on movement of said intermediate shift lever for engagement of reverse ratio said tip portion exerts a camming action upon said cam surface to thereby displace said shift fork towards said fourth-ratio position thereof only by a pre-synchronization amount effective to achieve noiseless synchronized engagement of said reverse ratio, and on return of movement of said intermediate shift lever said entrainment detent executing a pendulum movement to pass idly by said cam surface, with subsequent return of said other lever arm into abutment with said stop means, the length of the recess in said control shaft relative to the length of the shoulder of said intermediate shift member being such that when pre-synchronization for engagement of reverse ratio takes place the action of said blocking means is maintained.

4. In gearing: an input element; an output element; one ratio drive having a first gear rotatably mounted relative to one of said elements and a second gear in constant mesh with said first gear and drive connected to another of said elements; slidable coupling means operatively connected to said one of said elements and having synchronizer means operative in response to progressive movement for synchronization from a neutral position to a synchronizing position and then movement for engaging said coupling means with said first gear in a one ratio drive position for engagement of said one ratio drive; another ratio drive having gear elements for providing another ratio drive between said input element and said output element, teeth on two of said elements and a toothed member slidable from a neutral position disengaging said another ratio drive to another ratio drive position with said toothed member engaging said teeth on two of said elements for engagement of said another ratio drive; a shift member movable from neutral position through synchronizing position to one ratio drive position to actuate said coupling means; shift linkage means including a linkage member and selectively operatively having one ratio selecting movement establishing a positive connection to said shift member and then having one ratio drive movement from a neutral position through a synchronizing position to a one ratio drive position to move said shift member and coupling means for said movement for synchronization and said movement for engagement of said one ratio drive and selectively operatively having another ratio drive movement moving said linkage member and including another ratio selecting movement providing a connection to said toothed member and another ratio engaging movement to move said toothed member to said another ratio drive position; return detent means to return said shift member and coupling means from said synchronizing position to said neutral position; surface means operatively connected to and for movement with said shift member; and entrainment detent means having a stop fixed on said linkage member and a detent member movably mounted on said linkage member; biasing means to bias said detent member in one direction of movement to an acting position engaging said stop; said detent member on said another ratio drive movement of said linkage member engaging said surface means with the reaction force on said detent member acting in said one direction to fix said detent member against said stop and positively entraining and moving said surface means, said shift member, and said coupling means only through said movement for synchronization of said one and another ratio drives and, before the termination of said another ratio drive movement of said linkage member for engaging said another ratio drive, said detent member disengaging said surface means and said return detent means returning said shift member to terminate synchronization; and, on return movement of said linkage member from said another ratio drive position, said detent member moving in another direction to pass said surface means and then returned by said biasing means to said acting position.

5. In gearing: an input element; an output element; one ratio drive having a first gear rotatably mounted relative to one of said elements and a second gear in constant mesh with said first gear and drive connected to another of said elements; slidable coupling means operatively connected to said one of said elements and having synchronizer means operative in response to progressive movement for synchronization from a neutral position to a synchronizing position and then movement for engaging said coupling means with said first gear in a one ratio drive position for engagement of said one ratio drive; another ratio drive having gear elements for providing another ratio drive between said input element and said output element, teeth on two of said elements and a toothed member slidable from a neutral position disengaging said another ratio drive to another ratio drive position with said toothed member engaging said teeth on two of said elements to engage said another ratio drive; a shift member movable from neutral position through synchronizing position to one ratio drive position to actuate said coupling means; positive shift linkage means including a linkage member and selectively operatively having one ratio selecting movement establishing a positive connection to said shift member and then having one ratio drive movement from a neutral position through a synchronizing position to a one ratio drive position to move said shaft member and coupling means for said movement for synchronization and said movement for engagement of said one ratio drive and selectively operatively having another ratio drive movement moving said linkage member and including another ratio selecting movement providing a connection to said toothed member and another ratio engaging movement to move said toothed member to said another ratio drive position;

return detent means to return said shift member and coupling means from said synchronizing position to said neutral position; surface means operatively connected to and for movement with said shift member; and entrainment detent means having a stop fixed on said linkage member and a detent member pivotally mounted on said linkage member; biasing means to bias said detent member in one direction of rotation to an acting position engaging said stop; said detent member on said another ratio drive movement of said linkage member engaging said surface means with the reaction force on said detent member acting in said one direction to fix said detent member against said stop and positively entraining and moving said surface means, said shift member and said coupling means only through said movement for synchronization of said one and another ratio drives and, before the termination of said another ratio drive movement of said linkage member for engaging said another ratio drive, said detent member disengaging said surface means and said return detent means returning said shift member to terminate synchronization; and, on return movement of said linkage member from said another ratio drive position, said detent member pivoting in the opposite direction of rotation to pass said surface means and then returned by said biasing means to said acting position.

6. In gearing: an input element; an output element; one ratio drive having a first gear rotatably mounted relative to one of said elements and a second gear in constant mesh with said first gear and drive connected to another of said elements; slidable coupling means operatively connected to said one of said elements and having synchronizer means operative in response to progressive movement for synchronization from a neutral position to a synchronizing position and then movement for engaging said coupling means with said first gear in a one ratio drive position for engagement of said one ratio drive; another ratio drive having gear elements for providing another ratio drive between said input element and said output element, teeth on two of said elements and a toothed member slidable from a neutral position disengaging said another ratio drive to another ratio drive position with said toothed member engaging said teeth on two of said elements to engage said another ratio drive; a shift member movable from neutral position through synchronizing position to one ratio drive position to actuate said coupling means; positive shift linkage means including a selector shaft selectively operatively having one ratio selecting axial movement establishing a positive connection to said shift member and then having one ratio drive rotary movement from a neutral position through a synchronizing position to a one ratio drive position to move said shift member and coupling means for said movement for synchronization and said movement for engagement of said one ratio drive and selectively operatively having another ratio drive movement including another ratio selecting axial movement of said selector shaft providing a connection to said toothed member and another ratio engaging rotary movement to move said toothed member to said another ratio drive position; return detent means to return said shift member and coupling means from said synchronizing position to said neutral position; surface means operatively connected to and for movement with said shift member; and entrainment detent means having a stop fixed on said selector shaft and a detent member pivotally mounted on said selector shaft; biasing means to bias said detent member in one direction of rotation to an acting position engaging said stop; said detent member on said another ratio selecting axial movement of said selector shaft engaging said surface means with the reaction force on said detent member rotating said detent member in said one direction to fix said detent member against said stop and positively entraining and moving said surface means, shift member, and coupling means only through said movement for synchronization of said one and another ratio drives and, before the termination of said another ratio selecting axial movement of said selector shaft, said detent member disengaging said surface means and said return detent means returning said shift member to terminate synchronization; and, on return movement of said selector shaft from said another ratio drive position, said detent member pivoting in the opposite direction of rotation by said surface means to pass said surface means and then returned by said biasing means to said acting position.

7. The invention defined in claim 6, and said biasing means being a spring connected between said detent member and said selector shaft.

8. In gearing: an input element; an output element; one ratio drive having a first gear rotatably mounted relative to one of said elements and a second gear in constant mesh with said first gear and drive connected to another of said elements; slidable coupling means operatively connected to said one of said elements and having synchronizer means operative in response to progressive movement for synchronization from a neutral position to a synchronizing position and then movement for engaging said coupling means with said first gear in a one ratio drive position for engagement of said one ratio drive; another ratio drive having gear elements for providing another ratio drive between said input element and said output element, teeth on two of said elements and a toothed member slidable from a neutral position to a presynchronizing position disengaging said another ratio drive to another ratio drive position with said toothed member engaging said teeth on two of said elements to engage said another ratio drive; a shift member movable from neutral position through synchronizing position to one ratio drive position to actuate said coupling means; positive shift linkage means including another ratio lever connected to move said toothed member, and an intermediate lever selectively operatively having one ratio selecting axial movement establishing a positive connection to said shift member and then having one ratio engaging rotary movement from a neutral position through a presynchronizing position to a one ratio drive position to move said shift member and said coupling means for said movement for synchronization and said movement for engagement of said one ratio drive and selectively operatively having another ratio drive movement including another ratio selecting axial movement providing a connection to said another ratio lever and said toothed member and another ratio engaging rotary movement to rotate said intermediate lever and said another ratio lever to move said toothed member from neutral position to a presynchronizing position and to said another ratio drive position; return detent means to return said shift member from said synchronizing position to said neutral position; surface means operatively connected to and for movement with said shift member; and entrainment detent means having a stop fixed on said another ratio lever and a detent member pivotally mounted on said another ratio lever; biasing means to bias said detent member in one direction of rotation to an acting position engaging said stop; said detent member on said another ratio engaging rotary movement of said another ratio level from said neutral position only to said pre-synchronizing position engaging said surface means with the reaction force on said detent member in said one direction fixing said detent member against said stop and positively entraining and moving said surface means, shift member, and coupling means only through said movement for synchronization of said one and another ratio drives and, before said another ratio engaging rotary movement of said another ratio lever reaches said another ratio drive position, said detent member disengaging said surface means and said return detent means returns said shift member to terminate presynchronization and, on return movement of said another ratio lever from said another ratio drive position, said detent member pivoting in the opposite direction of rotation to pass said surface means and then returned by said biasing means to said acting position.

9. The invention defined in claim 8, and said biasing means being a portion of said detent member causing said detent member when free to rotate by gravity in said one direction to engage said stop.

* * * * *